United States Patent Office 3,072,686
Patented Jan. 8, 1963

3,072,686
16α-ALKYL-PREGNANE COMPOUNDS AND PROCESS FOR THEIR MANUFACTURE
Albert Wettstein, Karl Heusler, Jindrich Kebrle, Charles Meystre, and Peter Wieland, all of Basel, Switzerland, assignors to Ciba Corporation, a corporation of Delaware
No Drawing. Filed Oct. 8, 1959, Ser. No. 845,078
Claims priority, application Switzerland Oct. 10, 1958
17 Claims. (Cl. 260—397.4)

This invention relates to a new productive process for the manufacture of 16α-alkyl pregnane compounds.

It is known that $\Delta^{16}$-20-ketones of the pregnane series can be converted into 16α-alkyl-20-keto-pregnanes by reaction with alkyl-magnesium halides in the presence of cuprous halides. However, according to the information given in the literature concerning this reaction no satisfactory yields are obtained. For example, when this reaction is applied to $\Delta^{16}$-3β-hydroxy-20-keto-allopregnene or an ester thereof the yield of 16α-alkyl-compound is no more than about 20%.

The present invention is based on the observation that $\Delta^{16}$-20-keto-pregnene compounds can be converted in good yield into 16α-alkyl-pregnane compounds by treatment with an alkyl magnesium halide in the presence of a cuprous halide by carrying out the reaction with the alkyl magnesium halide and the cuprous halide in the presence of tetrahydrofurane and in the absence of alkyl halide, and decomposing the resulting 20-metal-enolates.

The process is illustrated by this diagram of formula:

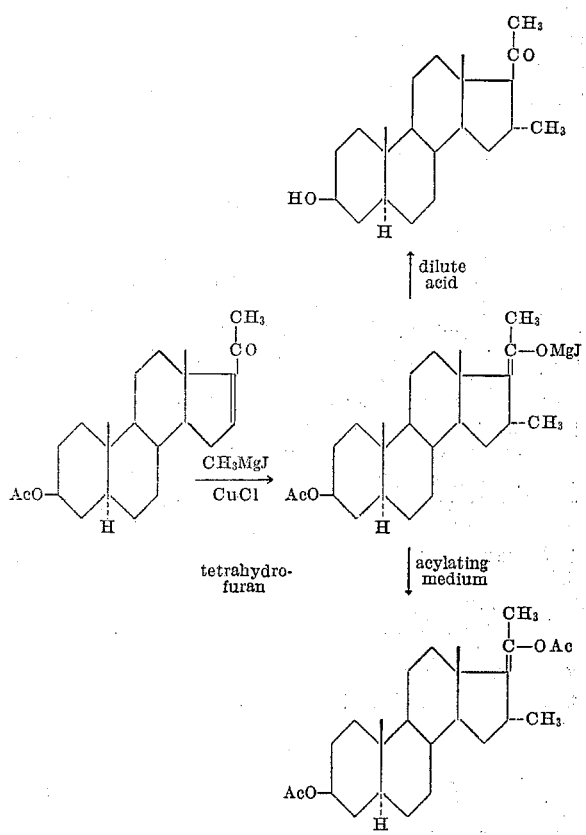

As alkyl magnesium compounds there are used more especially lower alkyl magnesium halides, for example, methyl magnesium iodide. In carrying out the reaction of the process of this invention it is necessary to take care that no alkyl halide remains in the alkyl magnesium halide solution used, which can easily be ensured by distillation, if necessary, with the use of an additional solvent, for example, benzene, or by using an excess of magnesium. As cuprous halides there are used those customarily used for such a reaction, especially cuprous chloride. Under these reaction conditions ester groups, for example, esterified hydroxyl groups such as acetoxy groups, are scarcely attacked or not at all and other α:β-unsaturated ketones, for example, $\Delta^4$-3-ketones and $\Delta^{1:4}$-3-ketones, are only attacked to a slight extent.

The reaction is usually carried out at room temperature. The decomposition of the 20-metal enolate is performed either with hydrolytic agents, e.g. by decomposition with a dilute acid such as hydrochloric or sulfuric acid, or with a solution of ammonium chloride, or with acylating agents; in this latter case acylates of the corresponding enols are obtained in lieu of the free 20-ketones. When the 16α-alkyl-20-keto-pregnane compounds so obtained contain free hydroxyl groups in the 3-position or the 3- and 21-positions, they may, if desired, be converted in known manner into esters and/or ethers thereof.

By the process of this invention it is possible to introduce in high yield an alkyl, especially a lower alkyl group, for example, a methyl group, into the 16α-position of any $\Delta^{16}$-20-keto-pregnene or -allopregnene.

The 16-alkyl compounds obtained by the hydrolytic decomposition of the metal enolates can be converted subsequently by a known process into the corresponding $\Delta^{17(20)}$-20-enol-acylates, especially the enol acetates which serve as starting materials for the synthesis of 17α-hydroxy-20-keto-5α- and 5β-pregnanes. Such process consists in reacting the 20-ketones with an acylating agent, for example acetic acid anhydride, in the presence of a strongly acidic catalyst, for instance para-toluene sulfonic acid, sulfuric acid or perchloric acid. In the case of 20-ketones which have an alkyl group, such as a lower alkyl group, e.g. a methyl radical in the 16-position, owing to the presence of this group the enol-acylation becomes very difficult so that the reaction proceeds slowly and with poor yields even under energetic reaction conditions.

In contrast, according to the process of the present invention the 20-enol-acylates are prepared by direct acylation of the metal-enolates resulting from the addition of the alkyl magnesium halides to the 16,17-double bond of the starting materials. In carrying out this acylation the metal enolates formed by the action of alkyl magnesium halides are advantageously not isolated, but are reacted with the acylating agent in the reaction solution, especially with a reactive derivative of a carboxylic acid. Such derivatives are especially the anhydrides, halides or quaternary amides of aliphatic, araliphatic, aromatic and heterocyclic carboxylic acids, such as lower fatty acids, for example, formic acid, acetic acid, propionic acid, butyric acid, phenylacetic acid, paranitrophenyl acetic acid, benzoic acid, paramethoxy-benzoic acid, 2:4:6-tribromobenzoic acid, furane-2-carboxylic acid etc. The acylating agents are used in approximately equimolecular proportions in relation to the alkyl-magnesium halides. The acylation takes place rapidly and is generally complete in a few minutes at room temperature. Occasionally it is necessary to cool the reaction mixture in order to prevent the reaction from becoming too vigorous. By the acylation there is mostly obtained a mixture of the two enol-acylates isomeric in the 20-position. In many cases the mixture or one or both of the isomeric forms can be obtained in a crystalline form. Both isomeric forms yield the same 16α-alkyl-17α-hydroxy-20-ketone after oxidation with a peracid and hydrolysis of the resulting 17:20-oxido-compounds.

By this decomposition of 20-metal-enolates not only can the known 16α-methyl-20-enol-acetates be obtained in a much better yield than by the process hitherto known, but there can be obtained enol-acylates which cannot be obtained by the known process. Thus, for example, it has not hitherto been possible to convert 21-acyloxy-20-ketones into 20-enol-acylates, and it has not been possible to obtain 20-enol-acylates from compounds containing free or ketalized $\Delta^4$-3-keto groupings without changing the latter groupings. In the case of 11:20-diketones it has indeed been possible by the known process to bring about a selective enol-acylation of the 20-keto-group, but it has not been possible to bring about the selective enol-acylation of other steroid polyketones. By the process of this invention, which completely avoids the use of an acid catalyst, 16α-alkyl-20-enol-acylates can be obtained even in the presence of a 21-acyloxy group, for example, a 21-acetoxy group, a $\Delta^4$- or $\Delta^{1,4}$-3-keto grouping or a ketalized oxo group, for example in the 3-, 6-, 7 and/or 12-positions.

Suitable starting materials are for example $\Delta^{16}$-3β- and 3α-hydroxy-20-keto-5α- and 5β-pregnene, $\Delta^{16}$-3β-hydroxy-11:20-diketo-5α-pregnene, $\Delta^{16}$-3β:11α-dihydroxy-20-keto-5α-pregnene, $\Delta^{16}$-3α-hydroxy-11:20-diketo-5β-pregnene, $\Delta^{16}$-3β-hydroxy-12:20-diketo-5α-pregnene, $\Delta^{5,16}$-3β-hydroxy-20-keto-pregnadiene, $\Delta^{5,16}$-3β-hydroxy-11:20-diketo pregnadiene, $\Delta^{5,16}$-3β:11α-dihydroxy-20-keto-pregnadiene, $\Delta^{5,16}$-3β-hydroxy-12:20-diketo-pregnadiene, $\Delta^{9(11),16}$-3β-hydroxy-20-keto-5α-pregnadiene, $\Delta^{9(11),16}$-3α-hydroxy-20-keto-5β-pregnadiene, $\Delta^{4,16}$-3:20-diketo-pregnadiene, $\Delta^{5,16}$-3-ethylenedioxy-20-keto-pregnadiene, $\Delta^{5,16}$-3-ethylenedioxy-11α-hydroxy-20-keto-pregnadiene, $\Delta^{5,16}$-3-ethylenedioxy-11:20-diketo-pregnadiene, $\Delta^{1,4,16}$-3:20-diketo-pregnatriene, $\Delta^{1,4,9(11),16}$-3:20 diketo-pregnatetraene, $\Delta^{3,5,16}$-3-ethoxy-20-keto-pregnatriene and also the corresponding compounds in which one or more hydroxyl groups present are esterified or etherified. There may also be used as starting materials the above compounds which also contain in the 21-position a free, esterified or etherified hydroxyl group, for example, $\Delta^{5,16}$-3β:21-dihydroxy-20-keto-pregnadiene, $\Delta^{5,16}$-3-ethylenedioxy-21-hydroxy-20-keto-pregnadiene, $\Delta^{5,16}$-3-ethylenedioxy-21-hydroxy-11:20-diketo-pregnadiene, or $\Delta^{5,16}$-3-ethylenedioxy-11α:21-dihydroxy-20-keto-pregnadiene and esters thereof.

The products of the instant process are important intermediate products for the synthesis of corticosteroids having a 16α-alkyl group, for example, 16α-methyl-9α-fluoro-prednisolone and -prednisone, and also 16α-methyl-17α-hydroxy-progesterone and esters thereof.

The synthesis of 16α-methyl-9α-fluoro-prednisolone from the 20-enol-acetate of e.g. 3β,11α-diacetoxy-16α-methyl-20-keto-allopregnane involves the following steps:

(1) Epoxidation in 17,20-position by means of an organic peracid and alkaline hydrolysis, whereby a hydroxy group is introduced in 17-position (2) Bromination in 21-position and exchange of the 21-bromine atom for an acyloxy group (3) Dehydrogenation of the hydroxyl group formed in step (1) in 3-position to an oxo group (4) Tosylation of the 11α-hydroxyl group (5) Formation of a 9,11-double bond by splitting off the tosylated 11-oxy group according to known methods and of double bonds in 1,2 and 4,5 position, e.g. by treatment with selenium dioxide (6) Formation of the fluorohydrin group in 9,11-position and saponification in 21-position according to known methods.

The following examples illustrate the invention:

Example 1

150 cc. of pure tetrahydrofurane are added to a Grignard-solution prepared from 2 grams of magnesium and 7 cc. of methyl iodide in 100 cc. of absolute ether. Under a calcium chloride seal the ether and the excess of methyl iodide are distilled off completely. The resulting suspension of methyl magnesium iodide in tetrahydrofurane is cooled to 20° C., and the reaction vessel is filled with dry oxygen-free nitrogen. There are then added 400 mg. of cuprous chloride. A solution of 5 grams of $\Delta^{16}$-3β-acetoxy-11:20-diketo-allopregnene in 50 cc. of pure tetrahydrofurane is then added dropwise at the same temperature under nitrogen, while stirring. The solution is stirred for a further 30 minutes, then cooled externally with ice, and cautiously decomposed with an aqueous solution of ammonium chloride. The mixture so obtained is diluted with ether, washed with a solution of ammonium chloride, water, a solution of sodium thiosulfate and water, dried, and evaporated. The amorphous residue is crude 3β-hydroxy-11:20-diketo-16α-methyl-allopregnane. It is dissolved in 10 cc. of dry pyridine and 20 cc. of acetic anhydride and the whole is allowed to stand for 15 hours at 20° C. Water is then added to the solution, and the solution is concentrated in vacuo and the residue is taken up in ether. The ethereal solution is washed with dilute hydrochloric acid and water, dried and evaporated. The residue is recrystallized from ether alone, or a mixture of ether and pentane or ether and isopropyl ether, and 4.58 grams of 3β-acetoxy-16α-methyl-11:20-diketo-allopregnane are obtained. It melts at 142–143° C., then crystallizes again to form broad prisms and the latter finally melt at 153° C. It has the specific rotation $[\alpha]_D^{27} = +80°$ (in chloroform). Its infra-red spectrum in methylene chloride shows bands, inter alia at 5.79μ, 5.86μ, 7.20μ (shoulder), 7.26μ (shoulder), 7.35μ, 8.13μ, 9.74μ.

Example 2

300 cc. of pure tetrahydrofurane are added to a Grignard solution prepared from 7 grams of magnesium and 30 cc. of methyl iodide in 200 cc. of absolute ether. Under a calcium chloride seal the ether and the excess of methyl iodide are completely distilled off. The methyl magnesium iodide suspension in tetrahydrofurane so obtained is cooled to 20° C. and the reaction vessel is filled with dry oxygen-free nitrogen. 1 gram of cuprous chloride is then added. A solution of 10 grams of $\Delta^{16}$-3β:11α-diacetoxy-20-keto-allopregnene in 150 cc. of tetrahydrofurane is added dropwise at the same temperature under nitrogen, while stirring. The solution is stirred for a further 30 minutes, then cooled externally with ice, and an aqueous solution of ammonium chloride is cautiously used for decomposition. The mixture so obtained is diluted with ether, and the ethereal solution is washed with ammonium chloride solution, water, a sodium thiosulfate solution and water, dried and evaporated. The amorphous residue is 3β:11α-dihydroxy-16α-methyl-20-keto-allopregnane. It is dissolved in 40 cc. of pyridine and 20 cc. of acetic anhydride and the whole is allowed to stand at 20° C. for 15 hours. Water is then added to the solution, the whole is concentrated in vacuo, and the residue is taken up in ether. The ethereal solution is washed with dilute hydrochloric acid and water, dried and evaporated. The crystalline residue (10.3 grams) is recrystallized from methanol, whereby 8.6 grams of 3β:11α-diacetoxy-16α-methyl-20-keto-allopregnane melting at 172–174° C. are obtained. Its infrared spectrum in methylene chloride shows bands inter alia at 5.79μ, 5.86μ, 7.20μ (shoulder), 7.26μ (shoulder), 7.34μ, 8.13μ, 8.64μ, 9.76μ. From the mother liquors there is obtained a further 0.74 gram of the same compound.

Example 3

200 cc. of pure tetrahydrofurane are added to a Grignard solution prepared from 6.9 grams of magnesium and 25 cc. of methyl iodide in 200 cc. of absolute ether. Under a calcium chloride seal the ether and the excess of methyl iodide are distilled off completely. The methyl magnesium iodide suspension in tetrahydrofurane so obtained is cooled to 20° C. and the reaction vessel is filled with dry oxygen-free nitrogen. 600 mg. of cuprous chloride are then added. A solution of 10 grams of $\Delta^{5,16}$-3β-acetoxy-20-keto-pregnadiene in 100 cc. of pure tetrahydrofurane is then added dropwise at the same temperature under nitrogen, while stirring. The solution is stirred for a further 30 minutes, then cooled externally with ice, and cautiously decomposed with an aqueous solution of ammonium chloride. The mixture so obtained is diluted with ether, and the ethereal solution is washed with an ammonium chloride solution, water, a sodium thiosulfate solution and water, dried and evaporated. The residue is recrystallized from acetone, whereby 8.48 grams of $\Delta^5$-3β-hydroxy-16α-methyl-20-keto-pregnene are obtained. It melts at 182° C., then partially crystallizes and finally melts at 188° C.

2 grams of the latter compound are dissolved with the aid of heat in 10 cc. of pyridine and 20 cc. of acetic anhydride. The solution is allowed to stand for 15 hours at 20° C., and the solution is decomposed with water and evaporated in vacuo. The residue is dissolved in ether, and the ethereal solution is washed with dilute hydrochloric acid and water, dried and evaporated. The residue is recrystallized from a mixture of acetone and isopropyl ether, whereby 1.9 grams of $\Delta^5$-3β-acetoxy-16α-methyl-20-keto-pregnene melting at 182–184° C. are obtained. It has the specific rotation $[\alpha]_D^{20} = 0°$ (chloroform), and its infra-red spectrum in methylene chloride exhibits bands, inter alia at 5.76μ, 5.86μ, 7.20μ (shoulder), 7.27μ, 7.34μ, 9.70μ.

Example 4

In the process described in Example 1, 5 grams of $\Delta^{16}$-3α-acetoxy-11:20-diketo-pregnene are used and there are obtained 4.6 grams of 3α-acetoxy-16α-methyl-11:20-diketo-pregnane which, after crystallization from a mixture of ether and pentane, melts at 157–158° C. and has the specific rotation $[\alpha]_D = +118°$ (chloroform).

By the process described in Example 3 there are obtained from 10 grams of $\Delta^{16}$-3β-acetoxy-20-keto-pregnene, 8.3 grams of 3β-hydroxy-16α-methyl-20-keto-pregnane melting at 203–205° C. By acetylating the latter compound there is obtained 3β-acetoxy-16α-methyl-20-keto-pregnane melting at 139–142° C. and having the specific rotation $[\alpha]_D = +39°$ (chloroform).

By using $\Delta^{5,16}$-3β:21-diacetoxy-20-keto-pregnadiene as starting material there is obtained in an analogous manner $\Delta^5$-3β:21-dihydroxy-16α-methyl-20-keto-pregnene, which when acetylated yields $\Delta^5$-3β:21-diacetoxy-16α-methyl-20-keto-pregnene melting at 160–170° C. after crystallization from hexane.

Example 5

In an atmosphere of nitrogen, 30 ml. of dry tetrahydrofurane free from peroxide and 30 ml. of dry toluene are added to 10 ml. of a 2.14-m methylmagnesium iodide solution (with a large excess of magnesium, prepared from 4 g. of magnesium shavings, 3.2 ml. of methyl iodide and 53 ml. of ether, with the greater part of the ether being distilled off) and heated until the temperature in the mixture is 78° C., 17 ml. of solvent distilling off. After cooling to 25° C., 100 mg. of dry cuprous chloride is added and stirred with the Grignard mixture for 5 minutes. After distilling off solvent and taking three test portions each of 4 ml. of the reaction mixture, the volume of the latter decreases to 41 ml. The test portion taken at the end of the pre-treatment produced with 25% ammonium chloride solution 20.7 ml. of methane, corresponding to a content of 9.47 millimols of Grignard complex in the reaction mixture. There is now run in in one batch at −10°–0° C. a solution of 1.6 g. of 16-dehydro-progesterone in 30 ml. of toluene, and, after removing the external cooling means the reaction is allowed to proceed at −10° C. to +12° C. for 30 minutes. Working up consists in mixing the product with an excess of ammonium chloride solution with the addition of a small quantity of sodium thiosulfate, taking up in benzene, drying, and distilling off the solvent under reduced pressure. On mixing the crude product with a small amount of ether there are obtained 1.2 g. of crystalline 16α-methyl-progesterone. Chromatographic purification of the mother liquor gives another 0.25 g. After recrystallization from n-hexane, the product melts at 137–138° C.

$\epsilon_{241m\mu} = 14{,}000$

IR spectrum, 5.78μ (20-ketone) and 5.98μ+6.17μ ($\Delta^4$-3-ketone).

Example 6

50 cc. of tetrahydrofurane are added, while stirring to a Grignard solution prepared from 0.4 gram of magnesium and 1.1 cc. of methyl iodide in 25 cc. of ether. The greater part of the Grignard compound is precipitated as a colorless powder. By heating, while stirring, 35 cc. of the solvent are distilled off, whereby the ether is removed to a great extent from the reaction mixture. To the suspension, cooled to 20° C., is added in an atmosphere of nitrogen, while stirring vigorously, first 0.1 gram of cuprous chloride in one portion and immediately after there is added at the same temperature in the course of 3 minutes a solution of 3.58 grams of $\Delta^{16}$-3β-acetoxy-20-keto-allopregnene in 20 cc. of tetrahydrofurane. The yellow colored reaction mixture is further stirred at room temperature for ½ hour and then a solution of 1.1 cc. of acetyl chloride in 10 cc. of tetrahydrofurane is added dropwise. The reaction mixture which has again become colorless is stirred for ½ hour and then stirred at room temperature with 50 cc. of ether and 30 cc. of a saturated aqueous solution of ammonium chloride. The aqueous layer is separated in a separating funnel. The tetrahydrofurane-ether solution is washed with sodium thiosulfate solution of 10% strength and again with ammonium chloride solution, dried with magnesium sulfate, evaporated, and freed as completely as possible from solvent by heating it at 80° C. for 2 hours in a high vacuum.

The glassy amorphous residue weighs 4.17 grams. The infra-red spectrum of this product and also enoltitration with bromine shows that it consists of 90–95% of theory of a mixture of $\Delta^{17(20)}$-3β:20-diacetoxy-16α-methyl-allopregnenes isomeric in the 20-position. The two isomeric enol-acetates can be largely separated from one another by crystallization from pentane. By dissolving the 4.17 grams of amorphous product in 7 cc. of warm pentane and allowing the solution to stand for a few hours in a cooling cabinet there crystallizes first a fraction melting at 102° C. From the concentrated mother liquor another fraction melting at 140° C. can be obtained. By analysis these two fractions have the same empirical formula $C_{26}H_{40}O_4$ and are found by titration with bromine to consist wholly of pure enol-acetates. In mixed melting point tests they show a depression of about 20° C. In the infra-red spectrum the isomer melting at 140° C. exhibits an intense, wide band in the 5.75μ region, a less intense inflection at 5.87μ and a band at 8.45μ of medium intensity. The infra-red spectrum of the isomer melting at 102° C., exhibits in the 5.75μ region a split double band, also an inflection at 5.87μ, and a relatively weak band at 8.45μ.

Example 7

By adding a solution of 3.56 grams of $\Delta^{5,16}$-3β-acetoxy-20-keto-pregnadiene in 20 cc. of tetrahydrofurane to a Grignard solution as described in Example 6 consisting of 0.4 gram of magnesium and 1.1 cc. of methyl iodide, after the addition of 0.1 gram of cuprous chloride, and then acetylating with 1.1 cc. of acetyl chloride, there are obtained after working up in the manner described in Example 6, 4.2 grams of an amorphous crude product. The latter is dissolved in 8 cc. of pentane. The solution is allowed to stand for 90 hours at −3° C., and then 3.82 grams of crystals (79% of the theoretical yield) are obtained, which melt at 95–98° C. According to analysis and the infra-red spectrum the crystals consist of a mixture of the two $\Delta^{5,17(20)}$-3β:20-diacetoxy-16α-methyl-pregnadienes isomeric in the 20-position. The infra-red spectrum of this mixture shows, inter alia, broad, intense bands at 5.75μ and 8.1μ, which denote the acetate groups, and further characteristic bands at 5.93μ, 8.37μ and 8.46μ of medium intensity. The infra-red spectrum shows that the mother liquor from which the above crystals are obtained contains about 70–80% of the same enol acetate, so that the total yield amounts to about 95%. In an analogous manner there are obtained from 2.70 grams of $\Delta^{5\cdot16}$-3β-acetoxy-11:20-diketo-pregnadiene 2.95 grams of a crude product containing about 93% of the two isomeric $\Delta^{5\cdot17(20)}$ - 3β:20-diacetoxy-11-keto-16α-methyl-pregnadiene.

*Example 8*

By reacting 3.1 grams of 16-dehydroprogesterone dissolved in 20 cc. of tetrahydrofurane with a Grignard compound prepared from 0.267 gram of magnesium and 0.72 cc. of methyl iodide by the method described in Example 6 and working up in an analogous manner, there is obtained a product of which the infra-red spectrum shows that it consists mainly of the mixture of the two $\Delta^{4\cdot17(20)}$-3-keto-16α-methyl-20-acetoxy-pregnadienes isomeric in the 20-position.

*Example 9*

To a solution of methyl magnesium iodide prepared from 1 gram of magnesium in 80 cc. of ether are added 190 cc. of absolute tetrahydrofurane and then 150 cc. of the solvent are distilled off in the course of ½ hour. The residual solution, cooled to 20° C., is first mixed with 250 mg. of cuprous chloride and then at a bath temperature of 20° C. in the course of 1¼ minutes with a solution of 6.75 grams of $\Delta^{16}$-3β:11α-diacetoxy-20-keto-allopregnene in 50 cc. of absolute tetrahydrofurane, the vessel containing the latter solution being rinsed out with 10 cc. of tetrahydrofurane. The temperature rises to 29° C. and the reaction mixture turns yellow. After stirring the mixture for 30 minutes, there is added dropwise, while cooling at a bath temperature of 20° C., in the course of 1¾ minutes a mixture of 3 cc. of acetyl chloride and 25 cc. of tetrahydrofurane, the temperature rising to 28° C. and the color changing from yellow to grey. The whole is then stirred for 40 minutes at room temperature, cooled to 5° C., and there are run in in succession 30 cc. of saturated ammonium chloride solution, 50 cc. of ether and 30 cc. of water. The two clear layers contained in the flask are washed with 100 cc. of ether in a separating funnel, then thoroughly shaken, and the aqueous phase is separated and again extracted with 75 cc. of ether. The organic phase is extracted by agitation in succession twice with 50 cc. of a 1-molar solution of sodium thiosulfate, a mixture of 50 cc. of saturated sodium chloride solution and 15 cc. of a saturated solution of sodium hydrogen carbonate and twice with 50 cc. of saturated sodium chloride solution, then dried with magnesium sulfate, and evaporated first under atmospheric pressure and then under the reduced pressure of a water jet pump. The residue is dissolved in xylene, evaporated in vacuo and these operations are repeated once more. A solution of the resulting oil in 50 cc. of hexane is filtered through 8 grams of aluminum oxide (activity III). The aluminum oxide is washed with 250 cc. of hexane, the eluate is evaporated under the reduced pressure of a water jet pump and the residue is dried for 1½ hours at 80° C. and 0.05 mm. pressure in a rotary evaporator. In this manner a considerable quantity of a fragrant oil distils. The practically colorless coating which remains and weighs 8.6 grams, is dissolved in 10 cc. of pentane and the solution is allowed to stand for several days at −15° C. The crystals which separate are then filtered off, washed with cold pentane, and dried at 80° C. under 0.05 mm. pressure for 4 hours. There are obtained 4.7 grams of $\Delta^{17(20)}$-3β:11α:20-triacetoxy-16α-methyl-allopregnene as a stereoisomeric mixture melting at 123.5–129° C. Owing to the ready solubility of the aforesaid enol-acetate a considerable quantity thereof is present in the mother liquor. The infra-red spectrum of the crystallized enol-acetate taken up in methylene chloride exhibits, inter alia, the following characteristic bands: At 5.78μ with inflection at 5.73μ and weak shoulders at 5.86μ (acetates and enol double bond); 8.11μ (acetates). Reacting in an analogous manner 6.70 grams of $\Delta^{5\cdot16}$-3β:11α-diacetoxy-20-keto-pregnadiene with methyl magnesium iodide and then with acetyl chloride there is obtained a difficultly crystallizable raw product containing about 80% of the two isomeric $\Delta^{5\cdot17(20)}$-3β:11α:20-triacetoxy-16α-methyl-pregnadienes.

*Example 10*

To a solution of methyl magnesium iodide in 80 cc. of ether prepared from 1 gram of magnesium are added 190 cc. of absolute tetrahydrofurane, and then 150 cc. of the solvent are distilled off in the course of ½ hour. To the residual solution, cooled to 10° C., are added first 250 mg. of cuprous chloride and then at a bath temperature of 20° C. in the course of 45 seconds a solution of 7 grams of $\Delta^{16}$-3β-acetoxy-11:20-diketo-allopregnene in 50 cc. of absolute tetrahydrofurane, the vessel containing the latter solution being rinsed out with 10 cc. of tetrahydrofurane. The temperature rises to 31° C. and the reaction mixture becomes yellow. After stirring the mixture for 30 minutes, there is added while cooling at a bath temperature of 20° C. in the course of 1¾ minutes a mixture of 3 cc. of acetyl chloride and 25 cc. of tetrahydrofurane, the temperature rising to 28° C. and the color changing from yellow to grey. The whole is then stirred at room temperature for 40 minutes, and cooled to 10° C., and there are run in in succession 30 cc. of saturated ammonium chloride solution, 50 cc. of ether and 30 cc. of water. The two clear layers in the flask are washed with 100 cc. of ether in a separating funnel, and then thoroughly shaken, and the aqueous phase is separated and again extracted with 75 cc. of ether. The organic phases are extracted by agitation in succession twice with 50 cc. of a 1-molar solution of sodium thiosulfate, a mixture of 50 cc. of saturated sodium chloride solution and 15 cc. of a saturated solution of sodium hydrogen carbonate, and twice with 50 cc. of saturated sodium chloride solution, and then dried with magnesium sulfate, and evaporated first at atmospheric pressure and then under the reduced pressure of a water jet pump. The residue is dissolved in xylene, evaporated in vacuo, then these operations are repeated once more. A solution of the resulting oil in 50 cc. of hexane is filtered through 8 grams of aluminum oxide (activity III). The aluminum oxide is washed with 250 cc. of hexane, the eluate is evaporated under the reduced pressure of a water jet pump, the residue is dried for 1½ hours at 80° C. under 0.05 mm. pressure in a rotary evaporator. A considerable quantity of a fragrant oil distils. The practically colorless coating which remains behind is dissolved in 14 cc. of pentane, the solution is allowed to stand for 20 hours at 0° C., and then the crystals which separate are filtered off and washed with cold pentane. There are obtained 6.2 grams of $\Delta^{17(20)}$ - 3β:20 - diacetoxy - 11 - keto - 16α - methyl - allopregnene in the form of a stereoisomeric mixture melting at 154–163° C. Recrystallization from 34 cc. of methanol raises the melting point to 164–165.5° C. The infra-red spectrum of the crystallized enol-acetate taken up in methylene chloride shows bands at 5.73μ plus 5.77μ (acetates); 5.85μ (11-ketone) and 8.13μ plus 8.24μ (acetates).

In a completely analogous manner there is obtained from $\Delta^{16}$-3α-acetoxy-11:20-diketo-pregnene a crystalline mixture of the two $\Delta^{17(20)}$-3α:20-diacetoxy-11-keto-16α-methylpregnenes isomeric in the 20-position.

*Example 11*

12.75 g. of 16-dehydro-progesterone are dissolved in 200 ml. of absolute toluene under nitrogen and cooled to 10° C. In the course of 50 minutes there are added while stirring at 9–11° C. 265 ml. of an 0.39-m suspension of methyl magnesium iodide complex in tetrahydrofurane containing 500 mg. of cuprous chloride. The content of Grignard complex is determined as described in connection with the preparation of 16α-methyl-progesterone. After a further reaction period of 5 minutes, a test portion of the reaction mixture, after decomposition (with ammonium chloride solution with the addition of a small quantity of sodium thiosulfate, taking up in benzene, drying, and evaporating the solvent under reduced pressure) gives an infrared spectrum without the 6.33μ band of $\Delta^{16}$-20-ketone, but with the 6.18μ band of the $\Delta^4$-3-ketone.

10–20 minutes after the completed addition of the Grignard suspension, there is added to the reaction mixture in the course of one minute at 10–15° C. a solution of 6 ml. of acetyl chloride in 50 ml. of tetrahydrofurane. After another reaction period of 20 minutes the whole is cooled to 10° C. and decomposed by the addition of a mixture, cooled to 5° C., of 80 ml. of 25% ammonium chloride solution and 25 ml. of 25% sodium thiosulfate solution. After stirring for a few minutes, the aqueous layer is separated and extracted once by shaking with benzene, which is also used for the extraction of the further aqueous washings. The organic layer is washed again with ammonium chloride-sodium thiosulfate solution (same quantity as above) and then with 100 ml. of ammonium chloride solution. The slightly turbid, combined organic solutions can be clarified and dried by stirring twice with anhydrous sodium sulfate. The crude product obtained on filtration and evaporation under reduced pressure and consisting of 80% of a mixture of the isomeric 16α-methyl-progesterone-20-enol acetate yields on addition of ether 2.6 g. of crystals of one of the isomers which, when recrystallized from ether, melt at 178–180° C.

$$\epsilon_{239m\mu} = 15,500$$

IR-spectrum: 5.72μ and 8.21μ (acetate), 5.98μ (3-ketone and enol), and 6.17μ ($\Delta^4$-double bond).

By chromatography over "Florisil" (activated magnesium silicate) and elutriation with a 95:5-mixture of hexane and acetone, there are obtained from the middle fractions 7.2 g. of a mixture of the isomeric enol acetates which according to the IR spectrum is pure, but which crystallizes but slowly and incompletely. From the latter fraction a very small quantity of unreacted 16-dehydro-progesterone can be isolated.

*Example 12*

11.1 g. of crude 16α-methyl-progesterone-20-enol acetate, dissolved in 110 ml. of ether, are mixed at 20° C. with 100 ml. of an 0.76-m solution of monoperphthalic acid in ethyl acetate. After 5½ hours at 18–23° C. the oxidimetric titer falls to 58% of the initial value. The reaction mixture is then diluted with benzene and the organic solution is washed in turn with solutions of sodium thiosulfate, sodium carbonate (ice-cold), and sodium chloride. After drying and distilling off the solvent under reduced pressure there remain behind 11 g. of crude epoxidation product which is dissolved in 500 ml. of methanol and, after the addition of 6.4 g. of potassium carbonate in 126 ml. of water, hydrolyzed by boiling for 2½ hours in an atmosphere of nitrogen. The methanol is removed by concentrating the reaction mass at room temperature under reduced pressure. There follows extraction by shaking with chloroform. The chloroformic extracts are dried and concentrated. There are left behind 7.5 g. of a crude product which is purified by chromatography over alumina (activity II). After initial eluates with benzene which contain 16α-methyl-progesterone, there is obtained by elutriation with a 1:1 benzene-ether mixture the 16α-methyl-17α-hydroxy-progesterone in the form of crystals melting at 217–220° C. $\epsilon_{242m\mu} = 16,600$ $[\alpha]_D^{27.5} = +37.3° \pm 2°$ (c.=1.0715 in chloroform). IR spectrum: 2.76μ+2.87μ (hydroxyl); 5.80μ (20-ketone) and 5.99μ+6.16μ ($\Delta^4$-3-ketone).

*Example 13*

600 cc. of tetrahydrofurane are added to a Grignard solution prepared from 4 g. of magnesium and 15 cc. of methyl iodide in 300 cc. of absolute ether, and the ether and the excess of methyl iodide then distilled off completely. The suspension is cooled to 20° C. before there are added while stirring in a current of nitrogen 800 mg. of cuprous chloride and then, in the course of 20 minutes, a solution of 10 g. of $\Delta^{5:16}$-3β-hydroxy-21-acetoxy-pregnadiene-20-one in 100 cc. of absolute tetrahydrofurane. The mixture is stirred for 30 minutes and then cooled to 0° C. and there are added carefully 200 cc. of an aqueous ammonium chloride solution, and then some ether. The organic solution is washed with water, dried and evaporated, and the residue (12.8 g.) acetylated for 20 hours with a mixture of 15 cc. of pyridine and 30 cc. of acetic anhydride. Water is added and the reaction mass evaporated under reduced pressure, and the residue taken up in ether. The ethereal solution is washed in turn with dilute hydrochloric acid, water, dilute sodium carbonate solution, and water, then dried and evaporated. On recrystallization of the residue from methanol there are obtained 6.75 g. of $\Delta^5$-3β:21-diacetoxy-16α-methyl-pregnene-20-one of melting point 155–170° C. After recrystallization from a mixture of acetone and hexane, the compound melts at 158–170° C. $[\alpha]_D^{27} = +1.4° \pm 2°$ (c.=0.738 in chloroform). IR spectrum: 5.71μ (21-acetate), 5.78μ (strong, 20-ketone+3-acetate) and 8.15μ (acetate).

What is claimed is:

1. Process for the manufacture of 16α-lower alkyl-pregnane-compounds by treating $\Delta^{16}$-20-keto-pregnene compounds with a lower alkyl magnesium halide in the presence of a cuprous halide, wherein the reaction with the lower alkyl magnesium halide and the cuprous halide is performed in the presence of tetrahydrofurane and in the absence of alkyl halide, and the resulting 20-metal-enolate is decomposed.

2. Process according to claim 1, wherein the 20-metal-enolate is reacted with an aqueous acid.

3. Process according to claim 1, wherein the 20-metal-enolate decomposed with an acylating agent.

4. Process according to claim 3, wherein the 20-metal-enolate is reacted with a carboxylic acid halide.

5. Process according to claim 3, wherein the 20-metal-enolate is reacted with a lower fatty acid halide.

6. Process according to claim 3, wherein the 20-metal-enolate is reacted with acetyl chloride.

7. Process according to claim 1, wherein the starting material is $\Delta^{16}$-3β-acetoxy-11,20-diketo-allopregnene.

8. Process according to claim 1, wherein the starting material is $\Delta^{16}$-3β,11α-diacetoxy-20-keto-allopregnene.

9. Process according to claim 1, wherein the starting material is $\Delta^{16}$-3α-acetoxy-11,20-diketo-pregnene.

10. Process according to claim 1, wherein the starting material is $\Delta^{16}$-3β-acetoxy-20-keto-allopregnene.

11. Process according to claim 1, wherein the starting material is $\Delta^{5,16}$-3β-acetoxy-20-keto-pregnadiene.

12. Process according to claim 1, wherein the starting material is $\Delta^{5,16}$-3β,21-diacetoxy-20-keto-pregnadiene.

13. Process according to claim 1, wherein the starting material is $\Delta^{5,16}$-3β-hydroxy-21-acetoxy-pregnadiene-20-one.

14. Process according to claim 1, wherein the starting material is $\Delta^{5,16}$-3β-acetoxy-11,20-diketo-pregnadiene.

15. Process according to claim 1, wherein the starting material is $\Delta^{5,16}$-3β,11α-diacetoxy-20-keto-pregnadiene.

16. Process according to claim 1, wherein the starting material is $\Delta^{4,16}$-3,20-diketo-pregnadiene.

17. $\Delta^{5,17(20)}$-3β,11α,20-triacetoxy - 16α - methyl-pregnadiene.

(References on following page)

References Cited in the file of this patent

UNITED STATES PATENTS

| | | |
|---|---|---|
| 2,694,078 | Ott et al. | Nov. 9, 1954 |
| 2,751,398 | Hunt et al. | June 19, 1956 |
| 2,773,079 | Djerassi et al. | Dec. 4, 1956 |
| 2,870,174 | Djerassi | Jan. 20, 1959 |
| 2,944,070 | Kollonitsch et al. | July 5, 1960 |
| 2,970,157 | Cutler et al. | Jan. 31, 1961 |
| 2,983,737 | Djerassi et al. | May 9, 1961 |
| 2,986,572 | Engel | May 30, 1961 |

OTHER REFERENCES

Marker et al.: J.A.C.S., 64, 1280 (1942).

Arth et al.: J. Am. Chem. Soc., vol. 80, 3160 (June 1958).

Loewenthal: Tetrahedron, vol. 6, No. 4 (June 1959), pp. 269–303.